(12) United States Patent
Schumacher et al.

(10) Patent No.: US 10,349,583 B2
(45) Date of Patent: Jul. 16, 2019

(54) TWINE KNOTTER WITH CENTRAL LUBRICATION

(71) Applicant: Rasspe Systemtechnik GmbH, Wermelskirchen (DE)

(72) Inventors: Fred Schumacher, Birnbach (DE); Heinz-Gunter Schumacher, Eichelhardt (DE); Michael Flanhardt, Langenfeld (DE); Andreas Acimas, Solingen (DE)

(73) Assignee: Rasspe Systemtechnik GmbH, Wermelskirchen (DE)

( * ) Notice: Subject to any disclaimer, the term of this patent is extended or adjusted under 35 U.S.C. 154(b) by 24 days.

(21) Appl. No.: 15/549,786

(22) PCT Filed: Mar. 21, 2016

(86) PCT No.: PCT/EP2016/000489
§ 371 (c)(1),
(2) Date: Aug. 9, 2017

(87) PCT Pub. No.: WO2016/146268
PCT Pub. Date: Sep. 22, 2016

(65) Prior Publication Data
US 2018/0027743 A1    Feb. 1, 2018

(30) Foreign Application Priority Data

Mar. 19, 2015    (DE) .................... 20 2015 002 432 U

(51) Int. Cl.
*A01F 15/14*    (2006.01)
(52) U.S. Cl.
CPC ............ *A01F 15/145* (2013.01); *A01F 15/14* (2013.01)

(58) Field of Classification Search
CPC .. A01F 15/145; A01F 13/00; A01F 15/00–18; A01F 15/141; A01F 15/143
See application file for complete search history.

(56) References Cited

U.S. PATENT DOCUMENTS

| 1,529,914 | A | * | 3/1925 | Prochazka | ............. | A01D 59/04 289/13 |
| 2,180,106 | A | * | 11/1939 | Hammer | ................ | A01D 59/04 56/432 |

(Continued)

*Primary Examiner* — Ismael Izaguirre
(74) *Attorney, Agent, or Firm* — Fay Sharpe LLP

(57) ABSTRACT

A centrally lubricated twine knotter for a press with twine tying, comprising at least one knotter driving disc, a knotter chassis, a knotter assembly and if necessary a knife lever, which can at least partly be supplied with lubricant, in the case of which the knotter driving disc is fastened on the knotter driveshaft that is driveable about its axis in a rotationally fixed manner, the knotter chassis is assigned to the knotter driving disc in such a manner that the knotter chassis with respect to the twine knotter stands fixed in space, the knotter chassis carries the knotter assembly forming the one or two knots in succession and if necessary the knife lever driven by a cam track of the knotter driving disc, the knotter assembly, comprises at least one twine holder and a knotter hook and for lubricating at least some of the bearings of a plurality of the driven components from the group of the knotter driving disc, knife lever, twine holder, knotter hook a central lubricating arrangement is provided, wherein an independent lubricant receiving and distribution housing is provided, the interior of which on the one hand is connected via a connecting line to a lubricant reservoir or a lubricant delivery means such as a lubricant pump and on the other hand directly to lubricant supply lines for the simultaneous supply of some or all bearings of the twine knotter by means of lubricant outlet openings directly fluidically connected to the former and that the lubricant (Continued)

receiving and distribution housing is docked to the knotter chassis on the outside via fastening means.

18 Claims, 4 Drawing Sheets

(56) References Cited

U.S. PATENT DOCUMENTS

| | | | | |
|---|---|---|---|---|
| 3,138,395 A * | 6/1964 | Harper | ............... | A01F 15/145 289/9 |
| 7,752,959 B1 * | 7/2010 | Roth | ............... | A01F 15/145 100/22 |
| 2012/0211979 A1 * | 8/2012 | Schumacher | ......... | A01F 15/145 289/2 |

* cited by examiner

TWINE KNOTTER WITH CENTRAL LUBRICATION

The present invention claims priority on PCT Application No. PCT/EP2016/000489 filed Mar. 21, 2016, which in turn claims priority on German Patent Application No. 20 2015 002 432.7 filed Mar. 19, 2015.

The invention relates to a twine knotter for a press with twine tying. In general, the twine knotter comprises at least one knotter driving disc, a knotter chassis, a knotter assembly and if necessary a knife lever, which can be at least partly supplied with a lubricant. The knotter driving disc is fastened on the knotter driveshaft that is driveable about its axis in a rotationally fixed manner. The knotter chassis is assigned to the knotter driving disc in such a manner that the knotter chassis with respect to the twine knotter stands fixed in space. The knotter chassis carries the knotter assembly forming one or two knots in succession as well as the knife lever driven by a cam track of the knotter driving disc. The knotter assembly comprises at least one twine holder and a knotter hook, which are driveable via a common drive toothing or via separate drive toothings of the knotter driving disc. For lubricating at least some of the bearings of a plurality of the driven components from the group of the knotter driving disc, knife lever, twine holder, and knotter hook, a central lubricating arrangement is provided.

BACKGROUND OF THE INVENTION

Twine knotters are generally exposed to rough environmental conditions in particular moisture and dust so that their numerous rotary bearings have to be supplied with lubricant from time to time. From WO 2011/054360, it is known to form the knotter chassis partly housing-like and thus, among other things, integrate a lubricant chamber filled with lubricant in the knotter chassis. Conducting the lubricant within the knotter frame through hollow spaces integrated in the knotter frame to the bearings is also known from EP 2 260 693 B1 and U.S. Pat. No. 7,752,959 B1.

When a plurality of twine knotters are combined on a common knotter driveshaft, as is also evident from DE 195 28 658 A1, it is further known to supply the various knotters with lubricant from a central lubricant reservoir.

It has now been recognized that the partial supply of lubricating points of the rotary bearings of twine knotters via internal hollow spaces integrated in the knotter chassis can be extraordinarily expensive, both with respect to the production and the assembly and also with respect to the maintenance of a twine knotter. Clogging of the lubrication ducts can decisively impair the function of the knotter.

SUMMARY OF THE INVENTION

The invention is based on the object of improving the production and the operational safety in the case of twine knotters with central lubrication. To solve this objective, a centrally lubricated twine knotter is provided in accordance with the present invention. The twine knotter comprises at least one knotter driving disc, a knotter chassis, a knotter assembly and if necessary a knife lever, which can be at least partly supplied with a lubricant. The knotter driving disc is fastened on the knotter driveshaft that is driveable about its axis in a rotationally fixed manner. The knotter chassis is assigned to the knotter driving disc in such a manner that the knotter chassis with respect to the twine knotter stands fixed in space. The knotter chassis carries the knotter assembly forming one or two knots in succession as well as the knife lever driven by a cam track of the knotter driving disc. The knotter assembly comprises at least one twine holder and a knotter hook, which are driveable via a common drive toothing or via separate drive toothings of the knotter driving disc. For lubricating at least some of the bearings of a plurality of the driven components from the group of the knotter driving disc, knife lever, twine holder, and knotter hook, a central lubricating arrangement is provided.

Accordingly, an independent lubricant receiving and distribution housing is provided with a generic centrally lubricated twine knotter. The interior of the lubricant receiving and distribution housing is connected on the one hand via a connection line directly or via a lubricant distributor to a lubricant reservoir and on the other hand by means of lubricant outlet openings directly connected to it, is directly fluidically connected to lubricant supply lines for the simultaneous supply of some or all bearings of the twine knotter. The lubricant receiving and distribution housing is attached to the knotter frame on the outside via fastening means.

The central lubricant unit according to the invention has proved to be particularly functionally safe and can also be retrofitted to twine knotters with low expenditure irrespective of the twine knotter type. Accordingly, the central lubricant unit can be used both with twine knotters of the McCormick type, in the case of which a common drive toothing jointly drives the knotter hook and the twine holder, and with twine knotter types with drive toothings that are separate for this purpose, in each case both with our without knife lever. The lubricant supply lines to the bearings of the twine knotter do not come in conflict with the numerous movement processes needed for the knot formation and can be adequately kept away from the rough surroundings of the twine knotter in a simple manner. Preferably, the lubricant receiving and distribution housing is arranged on the outside of the hub of the knotter chassis namely in a particularly preferred manner with its longitudinal extent approximately at a right angle and tangentially to the knotter driveshaft. Because of this, a comparatively large safety clearance to the inside of the knotter driving disc and to the knife lever that may be provided on the twine knotter can be maintained.

When the fastening means comprises a sheet metal strip which at one end is attached to the knotter chassis, in particular in the region of the hub of the knotter driving disc and at the other end on the lubricant receiving and distribution housing, vibrations and shocks during the operation of the twine knotter or the press comprising the twine knotter are cushioned. Through the resilient connection between the twine knotter and the lubricant receiving and distribution housing, the lubricant supply lines and in particular their connection to the lubricant outlet openings on the lubricant receiving and distribution housing are particularly well protected. Retrofitting a twine knotter initially lubricated only via individual lubricating nipples with a central lubrication according to the invention is carried out by attaching the lubricant receiving and distribution housing to the knotter chassis and connecting the lubricant supply lines to the lubricating points upon replacement of the initially present lubricating nipples.

In summary, there is provided a centrally lubricated twine knotter for a press with twine tying, comprising at least one knotter driving disc, a knotter chassis and a knotter assembly, which can be at least partly supplied with lubricant. The knotter driving disc is fastened on the knotter driveshaft that is driveable about its axis in a rotationally fixed manner. The knotter chassis is assigned to the knotter driving disc in such a manner that the knotter chassis with respect to the twine knotter stands fixed in space. The knotter chassis carries the knotter assembly forming one or two knots in succession. The knotter assembly comprises at least one twine holder and a knotter hook. For lubricating at least some of the bearings of the plurality of the driven components selected from the group of the knotter driving disc, twine holder, knotter hook, a central lubricating arrangement is provided. An independent lubricant receiving and distribution housing is provided, and wherein the interior of which is connected on the one hand via a connecting line to a lubricant reservoir or a lubricant delivery means such as a lubricant pump or a lubricant distributor, and on the other hand is directly fluidically connected to lubricant supply lines for the simultaneous supply of some or all bearings of the twine knotter by means of lubricant outlet openings that are directly connected to the same are attached to the knotter chassis on the outside via fastening means, and in particular detachably connected to the same.

The knotter chassis can carry a knife lever driven by a cam track of the knotter driving disc and a bearing of the knife lever is lubricatable by the central lubrication arrangement.

The twine holder of the knotter assembly can be is driven by a first drive toothing of the knotter driving disc and the knotter hook of the knotter assembly by a second drive toothing of the knotter driving disc, or both the knotter hook and also the twine holder are driveable by the same drive toothing.

The connecting line can be connected to the lubricant reservoir directly or subject to the intermediate connection of a lubricant distributor.

The lubricant receiving and distribution housing can be arranged on the outside of the hub of the knotter chassis.

The lubricant receiving and distribution housing can be is arranged with its longitudinal extent approximately at a right angle and tangentially to the knotter driveshaft.

The fastening means can comprise a sheet metal strip.

The sheet metal strip can be fastened at an end to the knotter chassis, and in particular in the region of the hub.

The sheet metal strip at the other end can be fastened to the lubricant receiving and distribution housing.

The sheet metal strip can be is angled at least once between its fastening points.

The aforementioned and the claimed components described in the exemplary embodiments to be used according to the invention in their size, shaping, material choice and technical conception are not subject to particular exceptional conditions so that the selection criteria known in the field of application can be applied without restriction.

Further details, features and advantages of the subject matter of the invention are obtained from the subclaims, from the following description and the associated drawing in which—exemplarily—an exemplary embodiment of a centrally lubricated twine knotter is shown. Individual features of the claims or of the embodiments can also be combined with other features of other claims and embodiments.

DETAILED DESCRIPTION OF EXEMPLARY EMBODIMENTS

Figure 1:
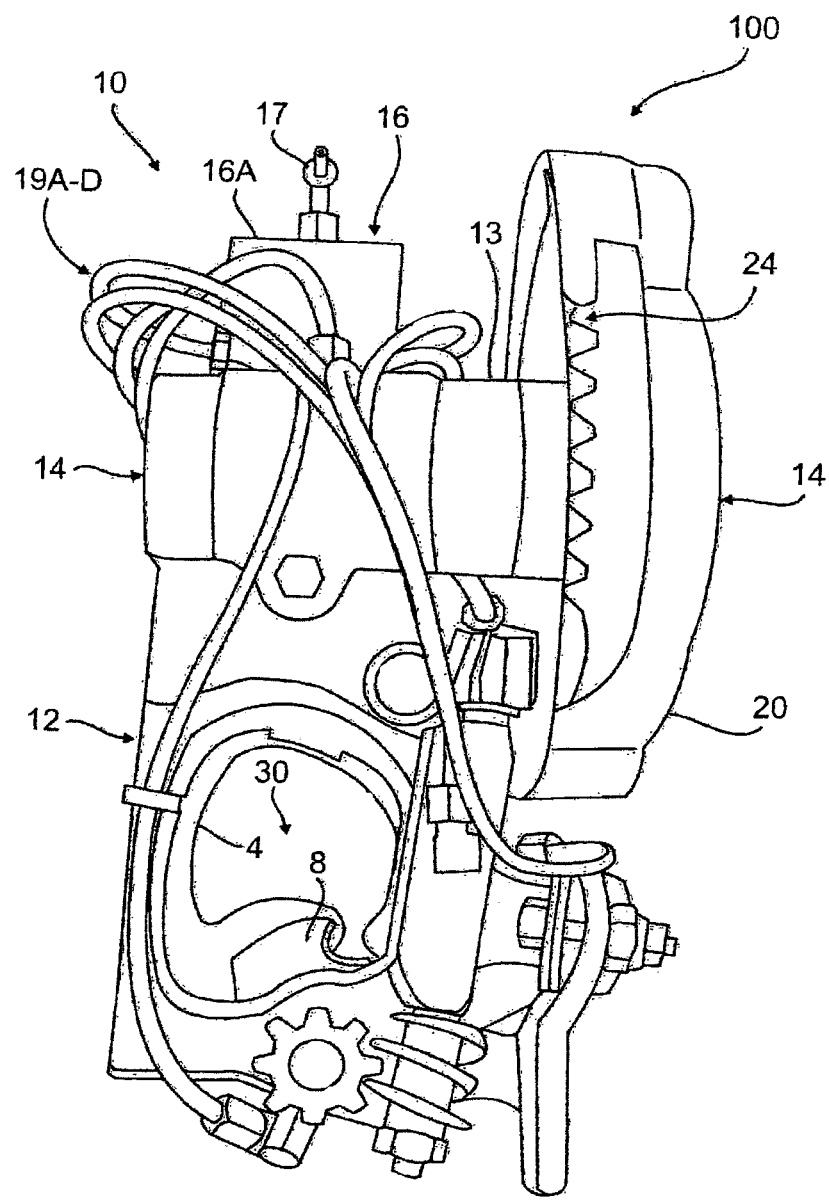
FIG. 1 shows a centrally lubricated twine knotter in a lateral view of the knotter chassis.
Figure 2:
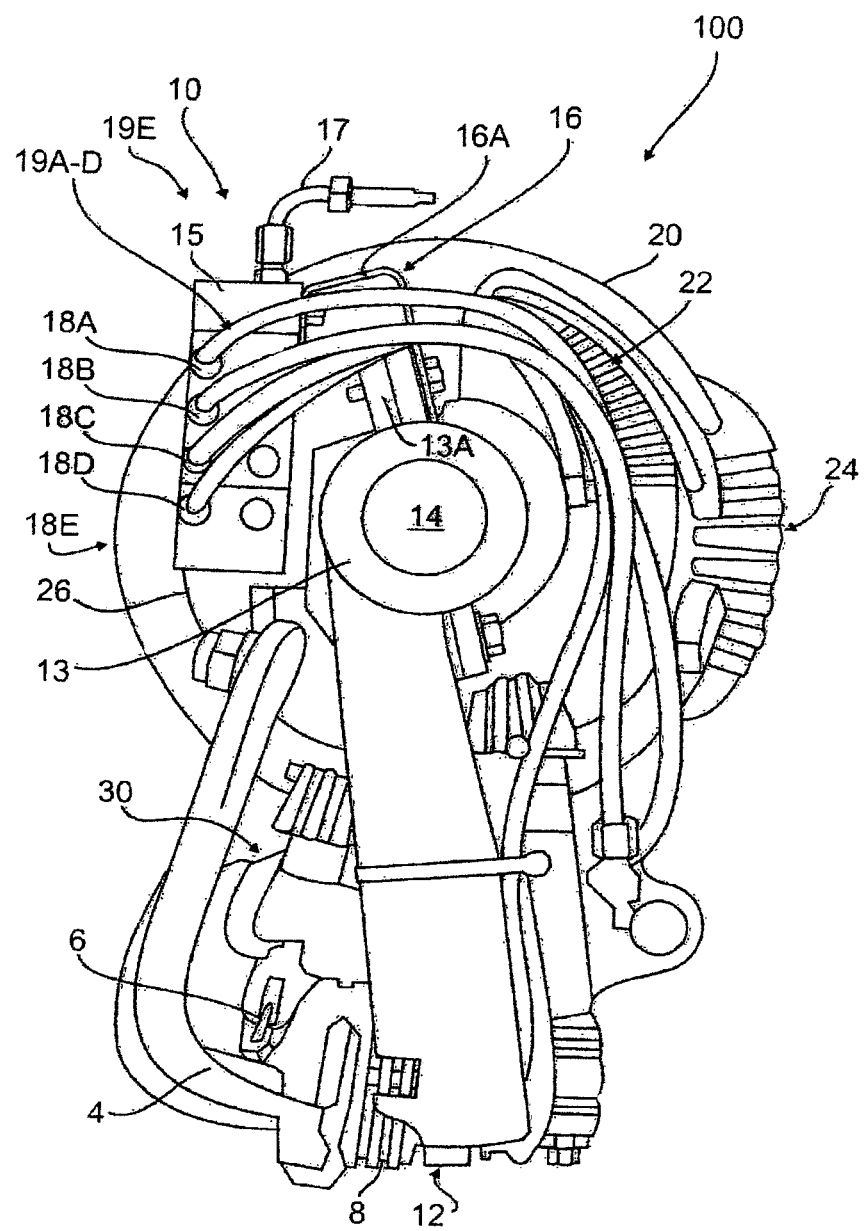
FIG. 2 shows the same centrally lubricated twine knotter in a front end view of the knotter driveshaft seen from the inside of the knotter driving disc.

The centrally lubricated twine knotter 100 visible from FIGS. 1 and 2 comprises a knotter driving disc 20, which is connected to the knotter driveshaft 14 in a rotationally fixed manner and is rotationally driven. A knotter chassis 12, also called knotter frame, is assigned to the knotter driving disc in such a manner that the knotter chassis 12 stands fixed. The knotter chassis 12 carries a knotter assembly 30 which makes it possible in a manner known per se to form one or consecutively two knots. Furthermore, the knotter chassis carries a knife lever 4, which is driven in the known manner via a cam track 26 provided on the inside of the knotter driving disc 20. The knotter assembly 30 comprises at least one twine holder 8 driven by a first drive toothing 22 provided on the inside of the knotter driving disc 20. Furthermore, the knotter assembly 30 comprises a knotter hook 6 driven by a second drive toothing 24 likewise provided on the inside of the knotter driving disc 20.

Supplying the necessary twines, the knotter process within the knotter and the cooperation of the press elements involved in bringing about a single knot or a double knot are described in the document DE 27 59 976 C1 (Hesston dated 22 Sep. 1983), the content of which is made subject of the present disclosure.

A multiply bent sheet metal strip 16A is screwed at an end to a radial extension 13A of the hub 13 formed on the knotter chassis 12 in a fixed manner. At the other end of the sheet metal strip 16*a*, the same is attached to an outer surface of a rectangular-shaped lubricant receiving and distribution housing 15 so that an elastic movement between the hub 13 and the housing 15 is possible. The central lubrication arrangement altogether marked with 10 consists on the one hand of the lubricant receiving and distribution housing 15, to the inner hollow space of which a connecting line 17 is fluidically connected. On the other hand, the inner housing hollow space is fluidically connected directly and without intermediate direction of valves to lubricant supply lines 19A to 19D via a plurality of lubricant outlet openings 18A to 18D, so that all lubricant supply lines 19A to 19D are simultaneously supplied with lubricant from the common hollow space of the lubricant receiving and distribution housing 15 via the connecting line 17 from a lubricant reservoir which is not shown in the drawing and known per se. Further lubricant outlet openings 18E . . . and further lubricant supply lines 19E . . . can be provided on further outer surfaces of the lubricant receiving and distribution housing 15, in particular on the back side of the lubricant receiving and distribution housing 15 obscured in FIG. 2.

The free ends of the lubricant supply lines 19A to 19D are provided with suitable connection fittings which are fluidically connected to the bearing points to be supplied with the lubricant instead of the usual lubricating nipples.

Figure 3:
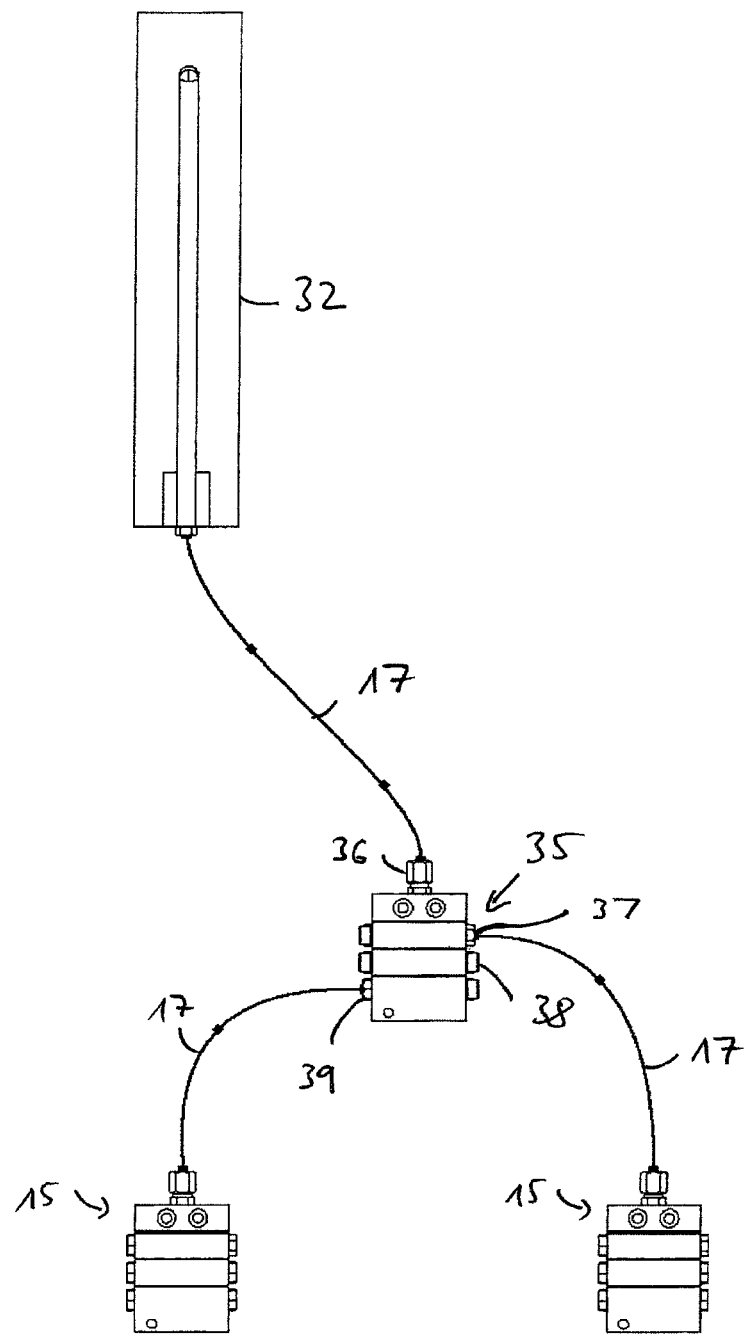
FIG. 3 illustrates the modular construction of the lubricating system.

According to the invention, the lubricating system is constructed in a modular manner, (see FIG. 3).

Accordingly, each twine knotter according to the invention together with the lubricant receiving and distribution housing 15 forms a twine knotter unit 100, which in a manner known per se can be arranged for example on a beam in multiple quantity adjacently to one another. Exemplarily, two twine knotter units 100 are provided in FIG. 3 of which merely the lubricant receiving and distribution housing 15 are illustrated in the figure below.

Here it is practical to not directly connect the connecting lines 17 leading to each twine knotter unit 100 to a lubricant reservoir 32 but to a lubricant delivery means in the form of a lubricant distributor 35.

Exemplarily, the lubricant distributor is provided with an inlet 36 and three outlets 37, 38, 39 if necessary as shown in each case on both sides of the housing 15, over which the lubricant is equally distributed in the manner known from the prior art.

Figure 4:
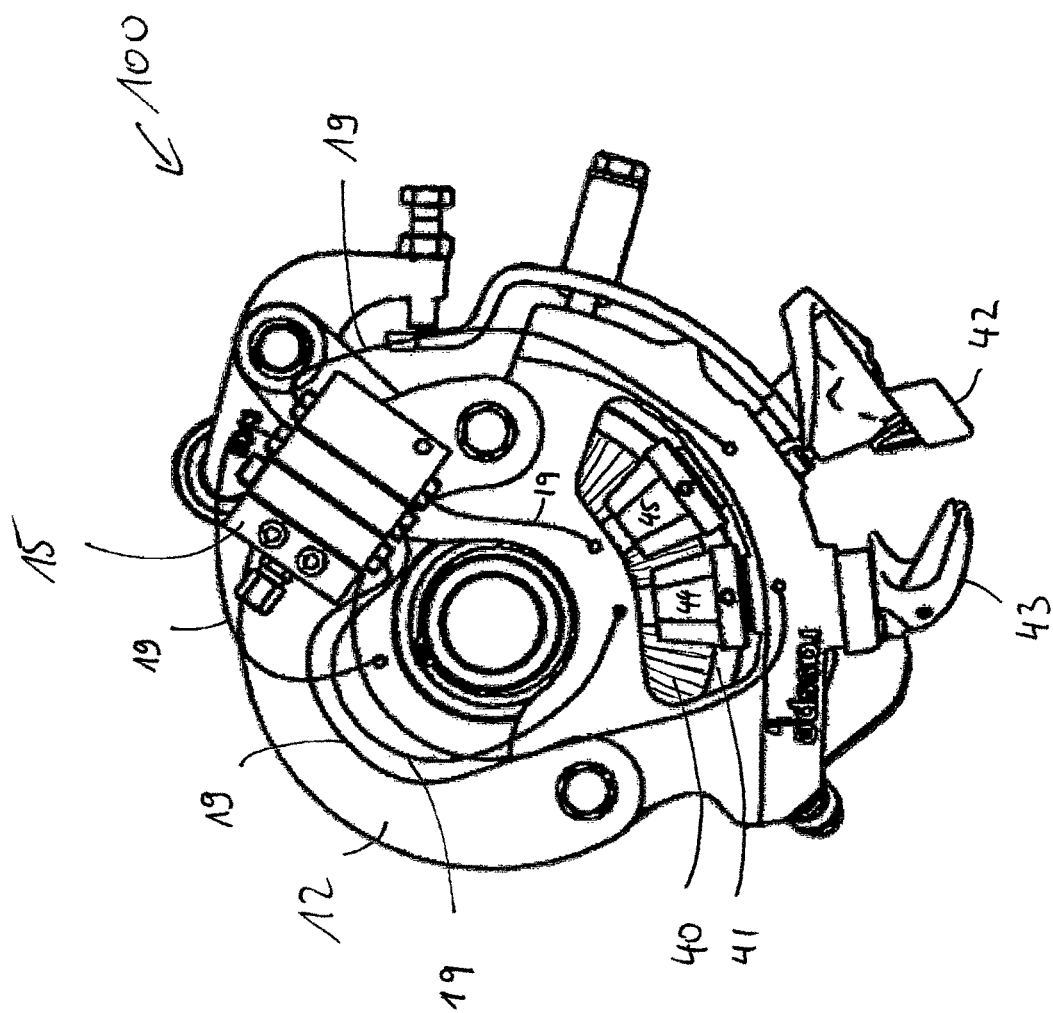
FIG. 4 illustrates an embodiment with a twine knotter of the McCormick type.

Depending on the quantity of the knotter assemblies (40), more than three lubricant outlets can be provided on the lubricant distributor (35). If necessary, the lubricant distributor (35) is also fed from a plurality of lubricant reservoirs (32). The invention is also useable with a twine knotter of the McCormick type, see FIG. 4. In the embodiment shown here, the twine knotter unit 100 has a knotter chassis 12 as in the embodiment according to FIGS. 1 and 2 with lubricant receiving and distribution housing 15 arranged thereon. A drive toothing 40 on a knotter driving disc 41 jointly drives a twine holder 42 and a knotter hook 43 via respective pinions 44, 45. A knife lever 40 is not provided as part of the knotter unit 100 in this embodiment.

The invention is useable in principle with double and also with single twine knotters.

LIST OF REFERENCE CHARACTERS

4 Knife lever
6 Knotter hook
8 Twine holder
10 Lubricating arrangement
12 Knotter chassis
13 Hub
13A Radial extension
14 Knotter driveshaft
15 Lubricant receiving and distribution housing
16 Fastening means
16A Sheet metal strip
17 Connecting line
18A-18D Lubricant outlet openings
19A-19D Lubricant supply lines
20 Knotter driving disc
22 First drive toothing
24 Second drive toothing
26 Cam track
30 Knotter assembly
32 Lubricant reservoir
35 Lubricant distributor
36 Inlet
37 Outlet
38 Outlet
39 Outlet
40 Drive toothing
41 Knotter driving disc
42 Twine holder
43 Knotter hook
44 Pinion
45 Pinion
100 Twine knotter

The invention claimed is:

1. A centrally lubricated twine knotter for a press with twine tying, comprising at least one knotter driving disc, a knotter chassis and a knotter assembly, which can be at least partly supplied with lubricant, in which the knotter driving disc is fastened on the knotter driveshaft that is driveable about its axis in a rotationally fixed manner, the knotter chassis is assigned to the knotter driving disc in such a manner that the knotter chassis with respect to the twine knotter stands fixed in space, the knotter chassis carries the knotter assembly forming one or two knots in succession, the knotter assembly comprises at least one twine holder and a knotter hook and for lubricating at least some of the bearings of the plurality of the driven components from the group of the knotter driving disc, twine holder, knotter hook a central lubricating arrangement is provided, characterized, in that an independent lubricant receiving and distribution housing is provided, the interior of which is connected via a connecting line to a lubricant reservoir or a lubricant delivery means such as a lubricant pump or a lubricant distributor that supplies lubricant to the independent lubricant receiving and distribution housing and also fluidically and valvelessly connected to lubricant supply lines, said independent lubricant receiving and distribution housing configured to simultaneous supply lubricant to some or all bearings of the twine knotter by means of lubricant outlet openings directly connected to the same is attached to the knotter chassis on the outside via fastening means, in particular detachably connected to the same.

2. The centrally lubricated twine knotter according to claim 1, characterized in that the knotter chassis carries a knife lever driven by a cam track of the knotter driving disc and a bearing of the knife lever is lubricatable by the central lubrication arrangement.

3. The centrally lubricated twine knotter according to claim 1, characterized in that the twine holder of the knotter assembly is driven by a first drive toothing of the knotter driving disc and the knotter hook of the knotter assembly by a second drive toothing of the knotter driving disc, or both the knotter hook and also the twine holder are driveable by the same drive toothing.

4. The centrally lubricating twine knotter according to claim 1, characterized in that the connecting line is connected to the lubricant reservoir directly or subject to the intermediate connection of a lubricant distributor.

5. The centrally lubricated twine knotter according to claim 1, characterized in that the lubricant receiving and distribution housing is arranged on the outside of a hub of the knotter chassis.

6. The centrally lubricated twine knotter according to claim 5, characterized in that the lubricant receiving and distribution housing is arranged with its longitudinal extent approximately at a right angle and tangentially to the knotter driveshaft.

7. The centrally lubricated twine knotter according to claim 1, characterized in that the fastening means comprises a sheet metal strip.

8. The centrally lubricated twine knotter according to claim 7, characterized in that the sheet metal strip is fastened at an end to the knotter chassis in particular in the region of the hub.

9. The centrally lubricated twine knotter according to claim 7, characterized in that the sheet metal strip at the other end is fastened to the lubricant receiving and distribution housing.

10. The centrally lubricated twine knotter according to claim 7, characterized in that the sheet metal strip is angled at least once between fastening points on the sheet metal strip.

11. A centrally lubricated twine knotter for a press with twine tying, said centrally lubricated twine knotter comprising:
- a. a knotter driving disc, said knotter driving disc fastened to a knotter driveshaft, said knotter driving disc rotatable about a central axis of said knotter driveshaft;
- b. a knotter assembly, which can be at least partly supplied with lubricant, said knotter assembly including a twine holder and a knotter hook, said twine holder rotatably driven by a first tooth drive located in said knotter driving disc, said knotter hook rotatably driven by said first tooth drive or a second tooth drive located in said knotter driving disc;
- c. a knotter chassis, said knotter chassis configured to carry said knotter assembly such that one knot or two successive knots can be formed, said knotter chassis supports said knotter driveshaft and said knotter driving disc such that said knotter driving disc rotates about said central axis of said knotter driveshaft while said knotter chassis remains in a fixed position; and,
- d. a lubricating arrangement, said lubricating arrangement configured to lubricate one or more bearings located in said knotter driving disc, said twine holder, and said knotter hook, said lubricating arrangement including a lubricant receiving and distribution housing having a cavity, a connecting line that is fluidly connected to said lubricant receiving and distribution housing such that lubricant can be supplied to said cavity of said lubricant receiving and distribution housing, and a plurality of lubricant supply lines connected at a first end to said lubricant receiving and distribution housing, each of said lubricant supply lines valvelessly connected to a lubricant outlet opening in said lubricant receiving and distribution housing such that lubricant contained in said cavity of said lubricant receiving and distribution housing can simultaneously flow into each of said lubricant supply lines, a second end of said lubricant supply lines connected to said knotter driving disc, said twine holder, and said knotter hook so as to supply said lubricant to said bearing in said knotter driving disc, said twine holder, and said knotter hook.

12. The centrally lubricated twine knotter as defined in claim 11, wherein said lubricant receiving and distribution housing is located about an outer surface of said knotter chassis and is separate from said knotter chassis, said lubricant receiving and distribution housing connected to said knotter chassis by a flexible metal strip to enable elastic movement between said lubricant receiving and distribution housing and said knotter chassis.

13. The centrally lubricated twine knotter as defined in claim 11, further including a knife lever located in said knotter chassis, said knife lever configured to be driven by a cam track of said knotter driving, at least one of said lubricant supply lines configured to supply lubricant to one or more bearings of said knife lever so as to lubricate said one or more bearings.

14. The centrally lubricated twine knotter as defined in claim 12, further including a knife lever located in said knotter chassis, said knife lever configured to be driven by a cam track of said knotter driving, at least one of said lubricant supply lines configured to supply lubricant to one or more bearings of said knife lever so as to lubricate said one or more bearings.

15. The centrally lubricated twine knotter as defined in claim 11, wherein said lubricant receiving and distribution housing is arranged with its longitudinal extent approximately at a right angle and tangentially to said central axis of said knotter driveshaft.

16. The centrally lubricated twine knotter as defined in claim 14, wherein said lubricant receiving and distribution housing is arranged with its longitudinal extent approximately at a right angle and tangentially to said central axis of said knotter driveshaft.

17. The centrally lubricated twine knotter as defined in claim 12, wherein said metal strip includes an angled portion between a connection location to said lubricant receiving and distribution housing and said knotter chassis.

18. The centrally lubricated twine knotter as defined in claim 16, wherein said metal strip includes an angled portion between a connection location to said lubricant receiving and distribution housing and said knotter chassis.

\* \* \* \* \*